United States Patent Office 2,759,857
Patented Aug. 21, 1956

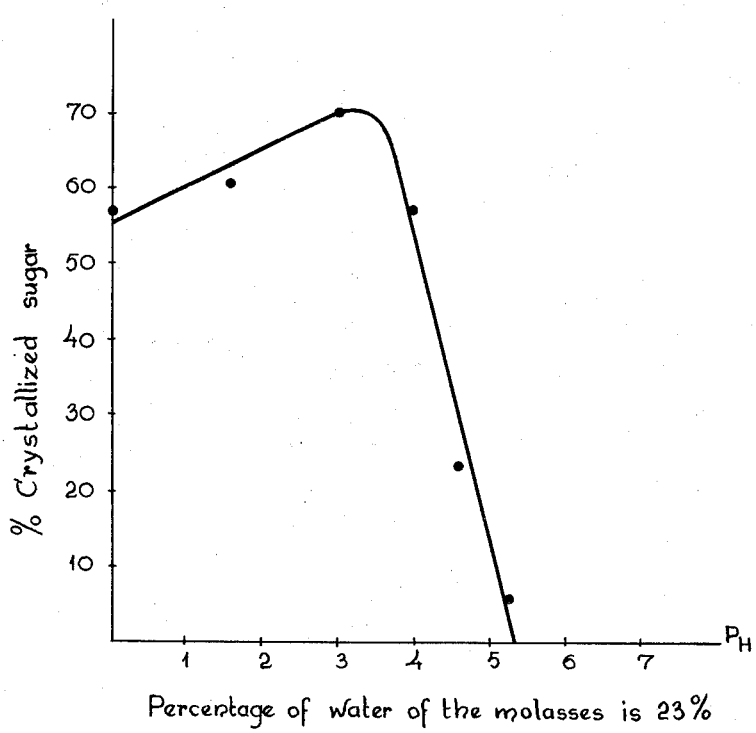
Percentage of water of the molasses is 23%

2,759,857

PROCESS FOR PURIFYING MOLASSES AND CRYSTALLIZING SUGAR THEREFROM

Jacob Van Julsingha, Amsterdam, Netherlands, assignor to N. V. Centrale Suiker Maatschappij, Amsterdam, Netherlands, a company of the Netherlands Application November 4, 1953, Serial No. 390,104

Claims priority, application Netherlands December 11, 1952

9 Claims. (Cl. 127—48)

In view of the fairly high sugar content of molasses several suggestions have been made for recovering sugar from molasses.

Thus Margueritte added to every kilogram of molasses 1 litre of 85% ethyl alcohol and such a quantity of sulphuric acid that the alkali compounds present were converted into sulphates; on an average 5% of sulphuric acid was sufficient for this. The sulphates were removed and the liquid was mixed with an equal volume of 95% ethyl alcohol. It was then alleged that in a few hours the sugar had separated out in the crystallized state and after purification had been recovered in a yield of 70% (vide Der Praktishce Rübenzuckerfabrikant und Raffinadeur, by L. Walkhoff, 4th ed. (187–), vol. 2, pp. 441–442, published by Friedrich Vieweg und Sohn, Braunschweig). Careful experiments have by no means been able to confirm this high yield of sugar, while moreover, owing to the flocculation of molasses, the sugar separated off was dark brown. The cause of the latter is the use of the large amount of ethyl alcohol. The rather slight yield of sugar is due to the water content of the mixture of molasses and ethyl alcohol; Margueritte, however, was bound to operate in the presence of such a large quantity of water because otherwise no homogeneous mixture of molasses and ethyl alcohol is formed.

According to the German patent specification No. 435,515 glacial acetic acid and benzene were added to condensed molasses. In the example 60 kg. of glacial acetic acid and 1 kg. of benzene were used for 100 kg. of molasses; the benzene reduces the viscosity of the mixture, and is said to decrease the quantity of glacial acetic acid that is required. It is said that after a few hours the sugar has crystallized and can be recovered in a yield of at least 70%. A large quantity of glacial acetic acid has to be used, owing to which the process is uneconomical; the salts remain in the molasses.

In the German patent specification No. 528,564 a similar process is described. In this case 50–60% by weight of glacial acetic acid was added to molasses which had been condensed as much as possible, and subsequently an approximately equal weight of dehydrated ethyl acetate (it was also possible to use methyl, propyl, isopropyl or butyl acetate. After a few hours all the sugar was said to have crystallized. The admixing of methyl alcohol and ethyl alcohol to glacial acetic acid for the same purpose was also said to be known.

As far as is known, none of these methods has been applied in practice. The main causes of this have already been mentioned above.

For the recovery of sugar from molasses the Steffen process has been applied. According to this process, from a highly diluted solution of molasses there are precipitated, with the aid of quick-lime, calcium saccharates, which are decomposed in saturation chests with carbon dioxide, upon which sugar is recovered from the sugar solution. Instead of calcium oxide, barium or strontium oxide may also be used.

Now it has been found that by the use of methyl alcohol and an acid it is not only easy to crystallize the larger part of the sugar from molasses, but that the sugar is thus obtained in the form of anhydrous crystals and in a high degree of purity without any purification, i. e. direct; the latter is at once to be seen from the colour. In order to achieve this, the molasses is mixed with methyl alcohol and an acid whose salts with the cations present in molasses are substantially insoluble in the molasses-methyl alcohol medium, until a thinly liquid mass with a pH lower than 5 has been obtained, the precipitated sulphates are removed, and the sugar is crystallized from the remaining solution. Suitable acids are, for example, sulphuric acid, phosphoric acid, and sulphurous acid. For practical purposes sulphuric acid was found very suitable.

In the course of the research it was found that only little sugar separates off at pH 5, and that no sugar precipitates at all when acidification does not proceed beyond pH 6. According as a lower pH value is chosen, more sugar crystallizes. The optimum of the pH is between 1 and 4; the process is preferably carried out at a pH of about 3. It is also possible to use pH values lower than 1. However, there is no sense in adding considerably larger quantities of acid, because in that case there are no more cations to be fixed, while moreover certain amino acids, such as betaine, will precipitate. The relation between the pH of the liquid and the quantity of crystallized sugar, as found in various experiments with sulphuric acid, is illustrated in the graph.

The acid can be added to the molasses, to the methyl alcohol or to the mixture of molasses and methyl alcohol. In practice the addition of the acid to the molasses has the drawback that it is difficult to mix the small quantity of acid homogeneously with the molasses; it is particularly when sulphuric acid is used that this involves difficulties (risk of local carbonization).

The precipitate formed by addition of the acid can be removed, e. g. filtered off, at ordinary temperature. It has, however, been found that the removal of the precipitate can be appreciably accelerated by causing the precipitate to form at a temperature above that of the surroundings or heating the liquid with the precipitate to temperatures above that of the surroundings, then cooling everything approximately to room temperature, and subsequently bringing about the separation of precipitate and liquid. Even a slight heating of the liquid or of liquid and precipitate to, say, 30–35° C. will subsequently give rise to an appreciably increased rate of filtration. With continued raising of the temperature this rate is increased considerably more. Little is to be gained, however, by raising the temperature beyond 80° C. For practical purposes a temperature of 40–50° C. was found to be sufficient.

In order to promote the crystallization of the sugar, another liquid is preferably added, which has to satisfy several requirements. It should be practically unable to dissolve sugar, it should be miscible with methyl alcohol, and it must not flocculate molasses, at least not in the quantity in which it is added. For a good yield of reasonably pure surgar in not too long a time the addition of this other liquid is of great importance.

The quantity of methyl alcohol that is added may vary within wide limits. In practice no more than 2 kg. of methyl alcohol per kg. of molasses will be taken, since a larger quantity of methyl alcohol will not cause the process to proceed any more satisfactorily. If too small a quantity of methyl alcohol is taken, the mixture obtained will contain too much water, owing to which the yield of sugar is greatly lowered; in view of this, less than 0.5 kg. of methyl alcohol per kg. of molasses will never be used, but in practice the lower limit will at least be raised to 0.6 kg. Research has revealed that in general the best proportion by weight of molasses to methyl alcohol to operate with is about 1:1.

The methyl alcohol need not be anhydrous. It should, however, be borne in mind that an increase of the water content causes a lowering of the yield of sugar.

For the other liquid the most varied organic liquids can be used. As examples, ethyl acetate, benzene, chloroform, and also ethyl alcohol are mentioned here. The optimum quantities of these different substances which are required generally vary owing to the nature of the substances. For practical purposes ethyl acetate and benzene are the first to be considered; the two liquids can be used in approximately equal quantities.

The quantity of this other liquid, calculated on the mixture of methyl alcohol and molasses, is best determined experimentally; this quantity may fluctuate between wide limits. If too large a quantity of the other liquid is taken, the limit of flocculation of the molasses is frequently reached, or even exceeded, which has an adverse effect on the colour of the sugar separated off. On the other hand one may considerably reduce the quantity of the other liquid, but this has the drawback that the crystallization of the sugar proceeds more slowly. For ethyl acetate and benzene, for example, it is suitable to take 45–200 g. of the said other liquids, but preferably about 100 g. to every kg. of the mixture of methyl alcohol and molasses.

In order that the sugar may crystallize more rapidly, the solution will preferably be inoculated with a small amount of fine crystallized sugar. The desalted solution may moreover be cooled. There is no harm in the methyl alcohol added to the molasses already containing a small amount of the other liquid. This should not, however, be too much; the upper limit is set by the requirement that the removal of the salts has to be completed before the sugar crystallizes. If, however, all the constituents are quickly mixed and the mixture is quickly filtered, the whole of the quantity of the other liquid may even be previously added to the methyl alcohol.

The separated salts as well as the sugar still contain some methyl alcohol. This can easily be removed from the solid substance and be recovered, if desired.

The mother liquor left after the crystallization of the sugar naturally contains the organic liquids added in the early stage of the process. They can be recovered by distillation and rectification. Molasses is then left behind. If desired, it can be condensed somewhat more, but as a rule this is not necessary. It forms the "second" molasses, which contains practically no more potassium compounds, in view of which—if necessary, after evaporation—it is eminently suited for cattle food or for ensilage.

Although the process described is specially suitable for working up beet sugar molasses, it is also possible to use cane sugar molasses as starting material. It should, however, be kept in mind that the latter molasses contains less sugar than beet sugar molasses.

The following examples illustrate the invention; from these it can also be seen what influence various factors have on the yield of sugar. In order to facilitate comparison, the same substances have always been used in the examples, except in Example II, where benzene has been used instead of ethyl acetate, and in Example III, where a different type of beet sugar molasses is started from.

*Example I*

Two parts by weight of beet sugar molasses with a moisture content of 23% and a sugar content of 50% are stirred together with 2 parts by weight of methyl alcohol until a perfectly homogeneous, thinly liquid mass has been obtained. Then 0.13 part by weight of concentrated sulphuric acid, calculated on the molasses, is slowly added with stirring; the pH of the liquid is 3. There is formed a precipitate of sulphates, mainly potassium sulphate, as also a small precipitate of proteins. The precipitate is removed, washed with methyl alcohol, and dried. The weight of the precipitate is now 0.265 part by weight.

To the clear liquid there is added 0.36 part by weight of ethyl acetate; the liquid remains homogeneous. It is then inoculated with 0.010 part by weight of fine crystallized sugar and introduced into a crystallizing apparatus. After a few hours sugar has crystallized in fine crystals. The precipitate is centrifuged and dried; the weight is 0.698 part by weight; the polarization is 98.2.

*Example II*

2.5 parts by weight of the molasses used in Example I are stirred together with 2.5 parts by weight of methyl alcohol until everything is completely dissolved.

Just as in Example I, 6.5% by weight of concentrated sulphuric acid, calculated on the molasses, is added. The pH is then 3.0. The process is further carried out as described in Example I, but benzene is used instead of ethyl acetate, in a quantity of 0.44 part by weight. After the crystallization of the sugar it is dried, and the yield is 0.870 part by weight. There is practically no difference between the effect of ethyl acetate and benzene.

*Example III*

Beet sugar molasses with a moisture content of 15% and a sugar content of 53% is used. The procedure is completely identical with that in Example I. The yield of dried sugar is now 0.778 part by weight. Owing to the lower moisture content of the molasses the quantity of sugar recovered is larger.

*Example IV*

Two parts by weight of molasses with a moisture content of 23% and a sugar content of 50% are stirred together with 2 parts by weight of methyl alcohol until a perfectly homogeneous mass has been obtained. Then there is added, with stirring, 0.13 part by weight of concentrated sulphuric acid, calculated on the molasses; the pH of the liquid is then 3. The precipitate is filtered off. To the clear liquid 0.18 part by weight of ethyl acetate is now added, and the sugar is left to crystallize; this takes place in about 16 hours. When 0.36 part by weight of ethyl acetate is used, the crystallization is completed after 7 hours. In both cases the yield is about 0.69 part by weight.

If 0.9 part by weight of ethyl acetate is added, the liquid becomes turbid and upon standing quietly, molasses gradually flocculates. If the mass is then introduced into a crystallizing apparatus, the sugar crystallizes in a very dark brown, syrupy form, with a purity considerably lower than in the preceding cases. The yield is slightly lower than in Example IV, viz. 0.61 part by weight.

*Example V*

Two parts by weight of molasses are mixed with 1.2 parts by weight of methyl alcohol and 0.13 part by weight of concentrated sulphuric acid is added. The quantity of the precipitate is now 0.187 part by weight. This is considerably lower than in Example I, because a larger quantity of water is present. Owing to the higher viscosity of the mixture, it is difficult to filter off the precipitate. After addition of ethyl acetate, 0.54 part by weight of sugar crystallizes.

*Example VI*

To 2 parts by weight of molasses there are added 4 parts by weight of methyl alcohol, and, after mixing, 0.13 part by weight of concentrated sulphuric acid is added. The precipitate formed is filtered off. After addition of ethyl acetate the liquid is introduced into a crystallizing apparatus. The yield of sugar is 0.711 part by weight, i. e. practically the same as in Example I. From this it is clear that there is no sense in increasing the quantity of methyl alcohol, since the higher cost of the evaporation of the methyl alcohol is not set off by the very slight increase of the yield of sugar.

*Example VII*

Five kg. of molasses are mixed with 5 kg. of methyl alcohol and the mixture is heated to 50° C. There is added 6% by weight of concentrated sulphuric acid, calculated on molasses. After this the mixture is rapidly cooled to room temperature. The precipitate formed is then sucked off in a Büchner funnel with a filter area of 5 dm.$^2$; the pressure below the filter is 40 cm. of mercury. The filtration time is 5 minutes. If the precipitate is formed and sucked off at room temperature, the filtration time is 15 minutes.

I claim:

1. Process of recovering sugar from molasses which comprises mixing 1 part by weight of molasses with from 0.6 to 2 parts by weight of methyl alcohol and an acid whose salts with the cations present in the molasses are substantially insoluble in the mixture of molasses and methyl alcohol in quantity sufficient to give the mixture a pH value within the range from about 1 to 5 at a temperature within the range from room temperature to about 80°, separating the liquid and solid phases of the resulting mixture and crystallizing sugar from the separated liquid phase.

2. Process as defined in claim 1 in which the acid is a member of the group consisting of sulfuric acid, phosphoric acid and sulfurous acid.

3. Process as defined in claim 2 in which the acid is sulfuric acid.

4. Process as defined in claim 2 in which the acid is phosphoric acid.

5. Process as defined in claim 2 in which an organic liquid of the group consisting of ethyl acetate, benzene, chloroform and ethyl alcohol in quantity insufficient to flocculate the molasses is added to said liquid phase after separation of said solid phase and prior to the crystallization of sugar therefrom.

6. Process as defined in claim 5 in which the organic liquid is ethyl acetate and the quantity thereof added is within the range from about 45 to about 200 grams per kilogram of said liquid phase.

7. Process as defined in claim 5 in which the organic liquid is benzene and the quantity thereof added is within the range from about 45 to about 200 grams per kilogram of said liquid phase.

8. Process as defined in claim 1 in which about 1 part by weight of methyl alcohol is mixed with about 1 part by weight of molasses, sulfuric acid is added until the pH value of the mixture is about 3, the mixture is subjected to a temperature within the range from about 30° to about 80° C. and then cooled to room temperature prior to separation of the solid and liquid phases of the mixture.

9. Process as defined in claim 8 in which the mixture is subjected to a temperature within the range 40–50° C.

References Cited in the file of this patent

UNITED STATES PATENTS

| Number | Name | Date |
|---|---|---|
| 345,810 | Schwengers | July 20, 1886 |
| 1,776,819 | Ricard | Sept. 30, 1930 |
| 2,000,202 | Vazquez | May 7, 1935 |
| 2,109,503 | Reich | Mar. 1, 1938 |
| 2,130,029 | Reich | Sept. 13, 1938 |
| 2,442,804 | Gaylor | June 8, 1948 |
| 2,501,914 | Payne | Mar. 28, 1950 |